June 2, 1970     P. P. UNTAMO     3,516,020

INVERTER STARTING CIRCUIT

Filed July 19, 1968

INVENTOR
P. P. UNTAMO
BY John P. ...
ATTORNEY

United States Patent Office 3,516,020
Patented June 2, 1970

3,516,020
INVERTER STARTING CIRCUIT
Peter P. Untamo, Branchburg Township, Somerset County, N.J., assignor to Bell Telephone Laboratories, Incorporated, Murray Hill and Berkeley Heights, N.J., a corporation of New York
Filed July 19, 1968, Ser. No. 746,014
Int. Cl. H02m 7/52
U.S. Cl. 331—113                                   7 Claims

ABSTRACT OF THE DISCLOSURE

In practical applications where considerable lead length with associated inductance exists between the D.C. input source and the inverter, it is not unusual to find a relatively slow increase in the direct voltage at the inverter which fails to start the inverter. In the present invention, a p-n-p-n device is serially connected with the starting network to prevent the application of the input D.C. to the starting network until sufficient energy is supplied from the input source to insure the initiation of oscillation in the inverter.

BACKGROUND OF THE INVENTION

This invention relates to D.C. to A.C. inverter circuits and more particularly to inverter starting network circuits.

Inverters are generally used to change a D.C. input to an A.C. which can be stepped up or down by a transformer and then rectified to obtain a D.C. level higher or lower than the input D.C. level. It is generally desirable that the oscillating frequency of the inverter be as high as possible to permit the filtering of noise and other effects with components of small physical size. These inverters generally employ a pair of alternately conducting transistors connected to pass current from the source to the load in respectively opposite directions. A regenerative feedback path is provided from the inverter output to the base-emitter path of each of the transistors to mainain continuous oscillation. Transformer or transistor saturation characteristics or separate timing components in the positive feedback path control the switching or oscillating frequency of the inverter.

Although inherent differences in the otherwise symmetrical circuit parameters, e.g., the transistors, may be sufficient to start oscillation in an inverter circuit, this method of starting the circuit is generally unreliable. In the prior art, additional starting networks, such as inductor-capacitor or resistor-capacitor networks, have been employed to provide a starting transient current surge at the time the input D.C. source is applied to the inverter to create a circuit unbalance that insures the initiation of oscillation in the inverter. If, however, the build-up of the D.C. input at the inverter terminals is less than abrupt, the starting transient current surge generated may be insufficient to initiate oscillation in the inverter. In practical circuits where considerable lead length with associated inductance may exist between the input D.C. source and the inverter input terminals, it is not unusual to find a relatively slow increase in the direct voltage at the inverter once the input voltage is applied. The prior art attempts at overcoming this problem have included devices that either interfere with the normal operation of the inverter once it is started or limit the starting current to a marginally low magnitude.

It is, therefore, an object of this invention to provide an inverter starting network that abruptly applies a starting transient current surge of a magnitude sufficient to guarantee oscillation in the inverter without interfering with the normal operation of the inverter.

SUMMARY OF THE INVENTION

In the present invention, a p-n-p-n semiconductor device is serially connected between the input D.C. source and the starting network to block the flow of starting current until sufficient energy is delivered from the input source to break down the semiconductor device. Once the semiconductor device breaks down, a transient surge of relatively large magnitude starting current flows through the starting network and the regenerative timing network to initiate conduction through one or the other of the inverter transistors. The semiconductor breakdown device thus insures that oscillation in the inverter is initiated regardless of the rate of increase at which the direct voltage is applied to the inverter. Once the inverter is started, the semiconductor device returns to its nonconductive state and effectively removes the starting network from the inverter. The starting network thus does not interfere with normal operation of the inverter. A diode poled for forward conduction in a direction opposite to the forward conduction direction of the p-n-p-n breakdown device may be connected across the breakdown device to provide a low impedance path for the reverse swing of the starting current transient and a discharge path for any energy stored in the starting network.

BRIEF DESCRIPTION OF THE DRAWINGS

Other objects and features of the present invention will readily be apparent from the following discussion and drawings in which.

DETAILED DESCRIPTION

Figure 1:
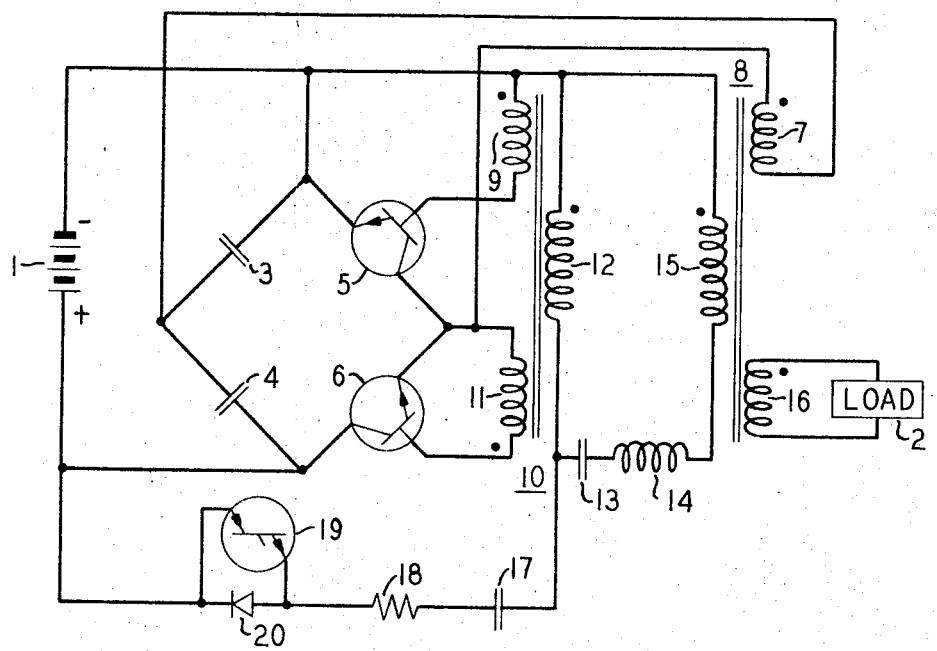
FIG. 1 is a schematic embodiment of the invention in an inverter with a resistor-capacitor starting network.

As can be seen from FIG. 1 of the drawings, power from the D.C. source 1 is inverted and supplied to the load 2. A bridge circuit having its input terminals connected across the input source 1 comprises capacitors 3 and 4 serially connected from one bridge input terminal to the other bridge input terminal. Capacitors 3 and 4 are chosen to have relatively large values of capacitance so that the capacitors present substantially short circuits at the operating frequency of the inverters. The collector-emitter paths of transistors 5 and 6 are also serially connected from one bridge input terminal to the other bridge input terminal. The junction of the collector-emitter paths of transistors 5 and 6 form one bridge output terminal while the junction of capacitors 3 and 4 form the other bridge output terminal. Winding 7 of transformer 8 is connected across the output terminals of the bridge. Winding 9 of transformer 10 is connected across the base and emitter electrodes of transistor 5 to provide positive regenerative feedback to this transistor, and winding 11 of transformer 10 is connected across the base and emitter electrodes of transistor 6 to provide positive feedback to this transistor. Winding 12 of transformer 10 is serially connected with the oscillation frequency control capacitor 13 and inductor 14 and the tertiary winding 15 of transformer 8. The secondary winding 16 of transformer 8 is connected with the load 2. The RC starting network comprising capacitor 17 and resistor 18 is serially connected by the shunt combination of p-n-p-n device 19 and a diode 20 from the positive terminal of the input source 1 to the junction of winding 12 and capacitor 13. The breakdown device 19 is poled for forward conduction in a direction opposite to the forward conduction through diode 20, as can be seen symbolically from FIG. 1 of the drawing.

Two terminal, four-layer semiconductor device 19 is chosen so as to be nonconductive in the forward direction until the energy across the device reaches a predetermined magnitude sufficient to breakdown, i.e., initiate conduction through, the device. Once the device breaks down, the voltage across the device falls from its relatively large magnitude prior to breakdown to a very small magnitude which for present purposes may be considered negligible. After the device breaks down in the forward direction, it remains in this state as long as a relatively small forward current flows through the device. Once the current falls below this magnitude, forward conduction ceases and the device is once again cut-off. Diode 20 limits the reverse voltage that can appear across the device 19. The characteristics of a device such as the p-n-p-n device 19 are discussed in detail at pages 460 through 465 in the text "Pulse, Digital, and Switching Waveform," Millman and Taub, copyright 1965 by McGraw-Hill, Inc.

As discussed heretofore, the inductance present in the leads connecting the input D.C. source 1 to the input vertices of the inverter bridge network may sufficiently limit the magnitude of the transient surge of starting current through the starting network comprising capacitor 17 and resistor 18 so as to prevent the initiation of oscillation in the inverter. (Current flow through an inductance exponentially increases from zero at the time the D.C. input is applied to a maximum value at some later time which is proportional to the resistance and inductance of the inductor.) In the present circuit, this difficulty is overcome by the use of a p-n-p-n semiconductor device 19 with the diode 20 shunted across it. This combination is serially connected with the starting network comprising capacitor 17 and resistor 18 to prevent application of the input D.C. source to the starting network until the energy at the input of the starting network is sufficient to break down the four-layer device. The four-layer device is selected to have a breakdown voltage capable of providing sufficient energy to provide a transient surge of starting current of a magnitude large enough to guarantee the initiation of oscillation in the inverter.

Once the four-layer device breaks down, the voltage across the device falls to a negligible magnitude, so that substantially the total energy of the D.C. input source 1 may be applied to start the inverter. At the instant the device 19 breaks down, capacitor 17 appears as a short circuit and then, as time goes on, charges at a rate determined by the resistor 18. The current through the capacitor thus exponentially falls from an initially high magnitude to nearly zero when the capacitor becomes charged. Current flow ceases when the charging current drops below holding current value of p-n-p-n device and the p-n-p-n device ceases to conduct, thereby removing the starting circuit from the inverter. The initial short-circuit surge of current flows from the source 1 through the four-layer device 19, the resistor 18, the capacitor 17, winding 12 of transformer 10, and back to the D.C. source 1. As can be seen from the dot convention on transformer 10, the surge of current through winding 12 induces voltage in windings 9 and 11 which drives transistor 5 into conduction and holds transistor 6 in cut-off. Current then flows from the positive terminal of source 1 through capacitor 4, winding 7 of transformer 8, the collector-emitter path of transistor 5, and back to the negative terminal of the source 1. Current flow through winding 7 of transformer 8 induces an output voltage in winding 16 for the load 2 and a feedback signal in winding 15. The current induced in winding 15 flows through the timing network comprising capacitor 13 and inductor 14 and winding 12 of transformer 10. As can be seen from the dot convention, the current through winding 12 drives transistor 5 further into conduction and transistor 6 further into cut-off. This regenerative process then continues until the oscillatory action of the series resonant circuit comprising capacitor 13 and inductor 14 causes the current in the loop comprising windings 12 and 15 to reverse. Reversing the current in this loop biases transistor 6 into conduction and transistor 5 into cut-off. The regenerative process discussed heretofore for transistor 5 then begins for transistor 6 until the series resonant network causes transistor 5 to again be conductive and transistor 6 to be cut-off and so on. An alternating voltage thus appears across the load 2.

Four-layer semiconductor device 19 thus insures that the energy level at the starting circuit is sufficient to insure the initiation of oscillation in the inverter and, additionally, removes the starting network from the inverter once oscillation is initiated. Diode 20 is connected across the p-n-p-n device 19 to provide a discharge path for the starting capacitor 17 once the input source 1 voltage is removed.

Figure 2:
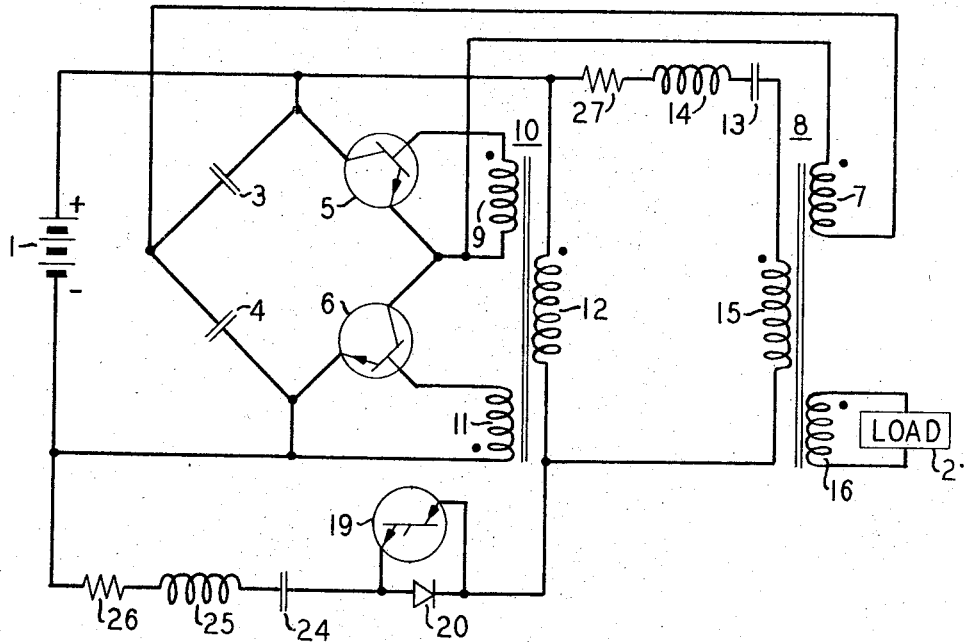
FIG. 2 is a schematic embodiment of the invention in an inverter with a resistor-inductor-capacitor starting network.

The circuit of FIG. 2 illustrates the use of four-layer semiconductor starting device with a resistor-inductor-capacitor inverter starting network. In the circuit of FIG. 2, a bridge circuit having its input terminals connected across the input source 1 comprises capacitors 3 and 4 serially connected from one bridge input terminal to the other bridge input terminal. (The junction of these capacitors form one bridge output terminal.) Capacitors 3 and 4 are chosen to have relatively large values of capacitance so that the capacitors present substantially short circuits at the operating frequency of the inverter. In the remaining arms of the bridge circuit, the collector-emitter paths of transistors 5 and 6 are serially connected from one input terminal to the other input terminal. The junction of the collector-emitter paths of transistors 5 and 6 form the other bridge output terminal. Winding 7 of transformer 8 is connected across the output terminals of the bridge. Winding 9 of transformer 10 is connected across the base and emitter electrodes of transistor 5 to provide positive feedback to this transistor, and winding 11 of transformer 10 is connected across the base-emitter path of transistor 6 to provide positive feedback to this transistor. Winding 12 of transformer 10 is serially connected with the oscillation frequency control capacitor 13, inductor 14, and resistor 27 and the tertiary winding 15 of transformer 8. The secondary winding 16 of transformer 8 is connected to the load 2. The series RLC starting network comprising capacitor 24, inductor 25, and resistor 26 are serially connected by the shunt combination of p-n-p-n device 19 and a diode 20 from the negative terminal of the input source 1 to the junction of windings 12 and 15. The breakdown device 19 is poled for conduction in the direction opposite to the forward conduction through diode 20 as can be seen symbolically from FIG. 1 of the drawing.

Four-layer semiconductor device 19 in the circuit of FIG. 2 functions in the same manner as the device 19 of the circuit of FIG. 1, i.e., the device insures that sufficient energy is present to insure that the starting network delivers a surge of transient current sufficient to guarantee the initiation of oscillation in the inverter. The surge of current through the resistor-inductor-capacitor starting network comprising capacitor 24, inductor 25, and resistor 26 causes the inductor-capacitor starting network to oscillate such that a damped sinusoid flows in the starting loop comprising source 1, winding 12 of transformer 10, breakdown device 19, capacitor 24, inductor 25, and resistor 26. The use of a resonant inductor-capacitor starting network with its characteristic damped sinusoidal current wave shape provides the advantage of overcoming any residual flux that may be present in the transformer, i.e., either the positive or negative peaks of the sinusoidal starting current will overcome the residual flux in the transformers and forward bias one or the other of the inverter transistors into conduction. Oscillation through the inverter is thus initiated and maintained in the same manner discussed in connection with the circuit of FIG. 1. Both resistor 26 in the starting network and resistor 27 in the frequency control network control the peak magnitudes of the currents through their respective networks. Diode 20 provides a low impedance both for the reverse swing of the starting transient and a discharge path for the starting capacitor 24 once the input source voltage 1 is removed.

It should be noted that in both the circuits of FIGS. 1 and 2, the use of a four-layer semiconductor device permits a surge of starting current to be delivered without incurring the penalty of interfering with the normal operation of the inverter or reducing the starting current to an undesirably low magnitude. The circuits of the prior art were able to overcome the aforenoted starting problem due to lead inductance, etc. only with devices that either introduced additional circuitry which interfered with the normal operation of the inverter or a starting network that limited the starting current to a marginally low magnitude which was often insufficient to start the inverter.

The above-described arrangement is illustrative of the application of the principles of the invention. Other embodiments may be devised by those skilled in the art without departing from the spirit and scope thereof.

What is claimed is:

1. An inverter comprising first and second transistors each having their collector-emitter paths serially connected with a source of input direct current and individual portions of the primary winding of a transformer, a load connected to the secondary winding of said transformer, a timing network regeneratively coupled to the base-emitter paths of said transistors to drive alternately said transistors between saturation and cut-off, and a starting network including a semiconductor breakdown device serially connected between said input source and said timing network to block current flow through said timing network until sufficient energy is delivered from said input source to insure the initiation of oscillation in said inverter.

2. An inverter in accordance with claim 1 wherein said semiconductor breakdown device is a p-n-p-n semiconductor device having a breakdown level at least sufficient to insure oscillation in said inverter and a substantially negligible voltage across its terminals at breakdown.

3. An inverter in accordance with claim 1 wherein a diode is connected across said breakdown device and poled for conduction in a direction opposite to the breakdown direction of said breakdown device.

4. An inverter comprising first and second transistors each having their emitter-collector paths serially connected with a source of direct current and individual portions of the primary winding of a transformer, a load connected to the secondary winding of said transformer, a timing network regeneratively coupled to the base-emitter paths of said transistors to drive alternately said transistors between saturation and cut-off, and a starting network comprising a resistor, a capacitor, and a p-n-p-n semiconductor breakdown device serially connected between said input direct current source and said timing network, said semiconductor breakdown device being poled to block the current flow from said direct current source until the energy applied to said resistor and said capacitor is sufficient to insure the initiation of oscillation in said inverter.

5. An inverter in accordance with claim 4 wherein a diode is connected across said breakdown device and poled for conduction in a direction opposite to the breakdown direction of said breakdown device to provide a low impedance path for the reverse swing of the starting transient and a discharge path for said capacitor once said inverter is started.

6. An inverter comprising first and second transistors each having base, collector, and emitter electrodes, first and second capacitors connected with the collector-emitter paths of said first and second transistors in a bridge configuration having a pair of input terminals and a pair of output terminals, one terminal of said first capacitor connected to the emitter electrode of said first transistor to form one bridge input terminal, one terminal of said second capacitor connected to the collector electrode of said second transistor to form the second bridge input terminal, the remaining terminals of said first and second capacitors being connected to form the first bridge output terminal, the collector electrode of said first transistor connected to the emitter electrode of said second transistor to form the second bridge output terminal, a source of input direct current connected across said first and second bridge input terminals, a first transformer having first, second, and third windings, means connecting said first winding across the base and emitter electrodes of said first transistor, means connecting said second winding across the base and emitter electrodes of said second transistor, a series resonant inductor-capacitor timing network, a second transformer having first, second, and third windings, means serially connecting said third winding of said first transformer, said series resonant timing network and said first winding of said second transformer, a load connected to the second winding of said second transformer, means connecting said third winding of said second transformer across said output terminals of said bridge, a series resistor-capacitor starting network, a p-n-p-n semiconductor device having a diode poled for conduction in a direction opposite to the breakdown direction of said breakdown device connected thereacross, and means serially connecting said series resistor-capacitor starting network and said p-n-p-n device with said input D.C. source and said third winding of said first transformer to insure the initiation of oscillation in said inverter.

7. An inverter in accordance with claim 6 wherein an inductor is serially connected with said resistor, said capacitor, and said breakdown device, whereby said starting network provides a damped sinusoidal characteristic capable of overcoming any residual flux which may be present in said transformer.

References Cited

UNITED STATES PATENTS 3,231,833   1/1966   Cooper            311—113

JOHN KOMINSKI, Primary Examiner